(12) United States Patent
Johnson et al.

(10) Patent No.: US 12,300,231 B2
(45) Date of Patent: May 13, 2025

(54) ENABLING MACHINE-TO-MACHINE COMMUNICATION FOR DIGITAL ASSISTANTS

(71) Applicant: AT&T Intellectual Property I, L.P., Atlanta, GA (US)

(72) Inventors: Lars Johnson, Brooklyn, NY (US); Wei Wang, Harrison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 286 days.

(21) Appl. No.: 17/940,082

(22) Filed: Sep. 8, 2022

(65) Prior Publication Data

US 2024/0087563 A1 Mar. 14, 2024

(51) Int. Cl.
*G10L 15/22* (2006.01)
*G10L 13/033* (2013.01)

(52) U.S. Cl.
CPC .......... *G10L 15/22* (2013.01); *G10L 13/0335* (2013.01); *G10L 2015/223* (2013.01)

(58) Field of Classification Search
CPC ..... G10L 15/22; G10L 13/0335; G10L 25/51; G10L 2015/223; H04W 4/70; H04L 65/1069; H04L 65/1059; H04M 1/72403; H04M 1/72563; H04M 3/42204; H04M 2203/2027; H04M 2203/6045
See application file for complete search history.

(56) References Cited

U.S. PATENT DOCUMENTS

| | | | |
|---|---|---|---|
| 2015/0373183 A1* | 12/2015 | Woolsey | H04M 1/72448 455/418 |
| 2020/0267224 A1* | 8/2020 | Doane | H04W 4/00 |
| 2021/0044640 A1* | 2/2021 | He | G10L 15/26 |

* cited by examiner

*Primary Examiner* — Yogeshkumar Patel
(74) *Attorney, Agent, or Firm* — Hartman & Citrin LLC

(57) ABSTRACT

Enabling machine-to-machine communication for digital assistants can include initiating a call with a called device, generating audio stream data having a first instance of audio and a first spoken command, which can be provided to the called device. A second instance of audio stream data can be received from the called device, can include a second spoken command, and can be analyzed to determine if it includes assistant signature data. If the second instance of audio stream data includes the assistant signature data, the devices can switch to machine-to-machine communications.

20 Claims, 10 Drawing Sheets

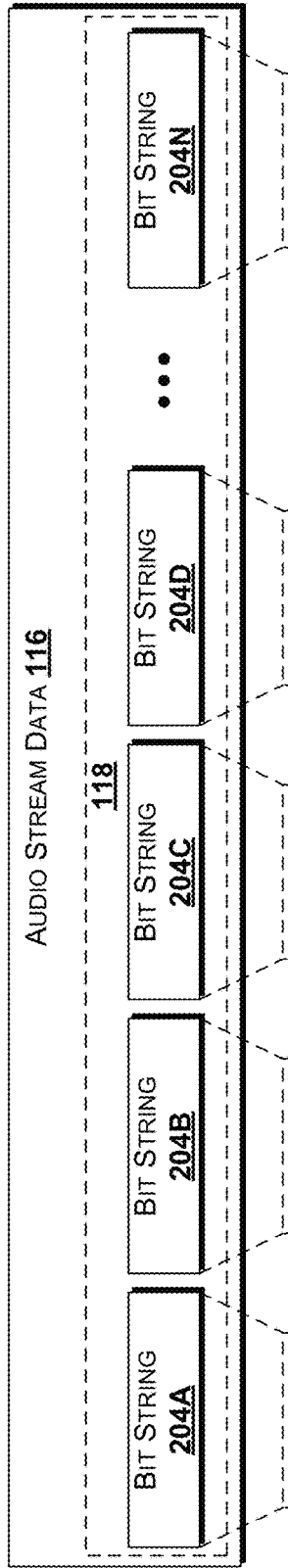
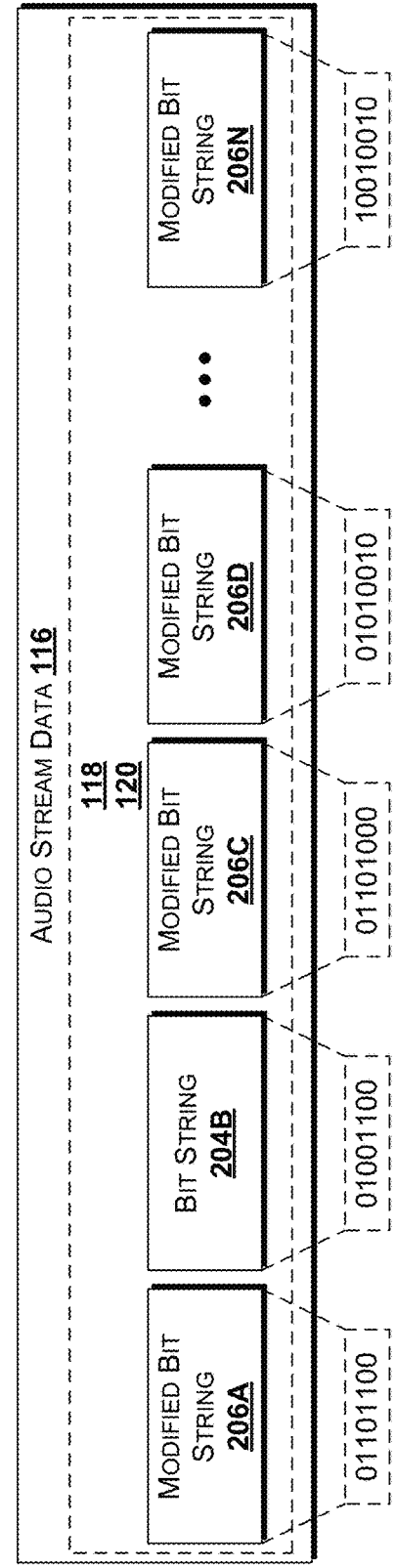
FIG. 2B

ENABLING MACHINE-TO-MACHINE COMMUNICATION FOR DIGITAL ASSISTANTS

BACKGROUND

As artificial intelligence continues to improve and become more commonplace, interactions with devices have similarly become more commonplace. Some consumers today may rely on computers and/or artificial intelligence to purchase goods and/or services, to make reservations for hotels or restaurants, and/or for other purposes. At times, two or more computers or instances of software may communicate with one another, unaware that the other party to the communication is a computer or another instance of software.

SUMMARY

The present disclosure is directed to enabling machine-to-machine communication for digital assistants. Two devices may initiate or join a call. For example, a calling device and a called device may be joined to a call. One or both of the calling device and the called device may communicate, at least in part, using a digital assistant, which may be provided by execution of one or more instances of the assistant module. The digital assistant may be configured to conduct communications using spoken commands and/or prompts such as phrases, words, or the like. These and/or other audio may be exchanged between the calling device and the called device as the audio stream data. It should be understood that this example is illustrative, and therefore should not be construed as being limiting in any way.

According to various embodiments of the concepts and technologies disclosed herein, the calling device and the called device can be configured to execute an instance of the assistant detection application to indicate to other parties that a digital assistant is conducting communications in the call on its behalf; and/or detect that a digital assistant is conducting communications in the call on behalf of the other party. It should be understood that this example is illustrative, and therefore should not be construed as being limiting in any way.

According to various embodiments of the concepts and technologies disclosed herein, the assistant detection application can be configured to include, in the audio stream data, assistant signature data that can include one or more tones or sounds; or modifications to bit strings associated with the audio stream data to indicate that a digital assistant is communicating. In some other embodiments, the assistant detection application can be configured to include, in the audio stream data, modified bits of bit strings and/or other data included in the audio stream data to indicate that a digital assistant is communicating. According to various embodiments of the concepts and technologies disclosed herein, the one or more tones or sounds, or modifications to the bit strings, may be undetectable by human beings and therefore if a digital assistant is not being used by one party to a call, no harm or interruption may be detected by the human or other party that is not a digital assistant. It should be understood that this example is illustrative, and therefore should not be construed as being limiting in any way.

The other party to the call can receive the audio stream data and the device (via an application) can analyze the audio for one or more instances of the assistant signature data, which can be included in the audio stream data. If the assistant signature data is detected, which can indicate that both parties to the call or conversation are digital assistants, the digital assistants can switch from a conversation using audible commands and/or requests to machine-to-machine communications. According to various embodiments of the concepts and technologies disclosed herein, machine-to-machine communications may be quicker and more efficient than spoken communications, and therefore can be used by the digital assistants to save time and/or resources such as bandwidth, voice time, or the like. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include initiating a call with a called device, and generating, using a first digital assistant, a first instance of audio stream data for the call. The first instance of audio stream data can include a first instance of audio and a first spoken command to be provided to the called device during the call. The operations further can include providing, to the called device and during the call, the first instance of audio stream data, and receiving, from the called device and during the call, a second instance of audio stream data. The second instance of audio stream data can include second audio, which can include a second spoken command. The operations further can include analyzing the second instance of audio stream data to determine if the second instance of audio stream data includes assistant signature data, and in response to a determination that the second instance of audio stream data includes the assistant signature data, switching to machine-to-machine communications with the called device during the call.

In some embodiments, generating the first instance of audio stream data can include obtaining a voice generator from an audio library stored in the memory and generating audio that represents the first spoken command. In some embodiments, generating the first instance of audio stream data can include obtaining a recorded spoken command from an audio library stored in the memory and generating audio that can include the first spoken command. In some embodiments, the assistant signature data can include a sound at a frequency that exceeds sixty-five thousand Hertz.

In some embodiments, the first spoken command can include two or more bit strings in binary, and generating the first instance of audio stream data for the call can include generating further assistant signature data by modifying respective least significant bits of the two or more bit strings to obtain two or more modified bit strings. Each of the modified bit strings can end with a least significant bit that has been forced to a same value. In some embodiments, the first spoken command can include a sound at a frequency that exceeds twenty thousand Hertz. In some embodiments, the machine-to-machine communications can include a data session.

According to another aspect of the concepts and technologies disclosed herein, a method is disclosed. The method can include initiating, by a calling device including a processor, a call with a called device; and generating, by the processor and using a first digital assistant, a first instance of audio stream data for the call. The first instance of audio stream data can include a first instance of audio and a first spoken command to be provided to the called device during the call. The method also can include providing, by the processor and to the called device and during the call, the first instance of audio stream data; and receiving, by the processor and from the called device and during the call, a second instance of audio stream data. The second instance of audio stream data can include a second instance of audio, which can include a second spoken command. The method also can include analyzing, by the processor, the second instance of audio stream data to determine if the second instance of audio stream data can include assistant signature data; and in response to a determination that the second instance of audio stream data can include the assistant signature data, switching, by the processor, to machine-to-machine communications with the called device during the call.

In some embodiments, generating the first instance of audio stream data can include obtaining a voice generator from an audio library stored in the memory and generating audio that represents the first spoken command. In some embodiments, generating the first instance of audio stream data can include obtaining a recorded spoken command from an audio library stored in the memory and generating audio that can include the first spoken command. In some embodiments, the assistant signature data can include a sound at a frequency that exceeds sixty-five thousand Hertz.

In some embodiments, the first spoken command can include two or more bit strings in binary, and generating the first instance of audio stream data for the call can include generating further assistant signature data by modifying respective least significant bits of the two or more bit strings to obtain two or more modified bit strings. Each of the modified bit strings can end with a least significant bit that has been forced to a same value. In some embodiments, the first spoken command can include a sound at a frequency that exceeds twenty thousand Hertz. In some embodiments, the machine-to-machine communications can include a data session.

According to yet another aspect of the concepts and technologies disclosed herein, a computer storage medium is disclosed. The computer storage medium can store computer-executable instructions that, when executed by a processor, cause the processor to perform operations. The operations can include initiating a call with a called device, and generating, using a first digital assistant, a first instance of audio stream data for the call. The first instance of audio stream data can include a first instance of audio and a first spoken command to be provided to the called device during the call. The operations further can include providing, to the called device and during the call, the first instance of audio stream data, and receiving, from the called device and during the call, a second instance of audio stream data. The second instance of audio stream data can include a second instance of audio, which can include a second spoken command. The operations further can include analyzing the second instance of audio stream data to determine if the second instance of audio stream data can include assistant signature data, and in response to a determination that the second instance of audio stream data includes the assistant signature data, switching to machine-to-machine communications with the called device during the call.

In some embodiments, generating the first instance of audio stream data can include obtaining a voice generator from an audio library stored in the memory and generating audio that represents the first spoken command. In some embodiments, generating the first instance of audio stream data can include obtaining a recorded spoken command from an audio library stored in the memory and generating audio that can include the first spoken command. In some embodiments, the assistant signature data can include a sound at a frequency that exceeds sixty-five thousand Hertz.

In some embodiments, the first spoken command can include two or more bit strings in binary, and generating the first instance of audio stream data for the call can include generating further assistant signature data by modifying respective least significant bits of the two or more bit strings to obtain two or more modified bit strings. Each of the modified bit strings can end with a least significant bit that has been forced to a same value. In some embodiments, the first spoken command can include a sound at a frequency that exceeds twenty thousand Hertz. In some embodiments, the machine-to-machine communications can include a data session.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIGS. 2A-2B are line drawings that schematically illustrate aspects of including assistant signature data in audio stream data during a call, according to some illustrative embodiments of the concepts and technologies disclosed herein.

DETAILED DESCRIPTION

Figure 1:
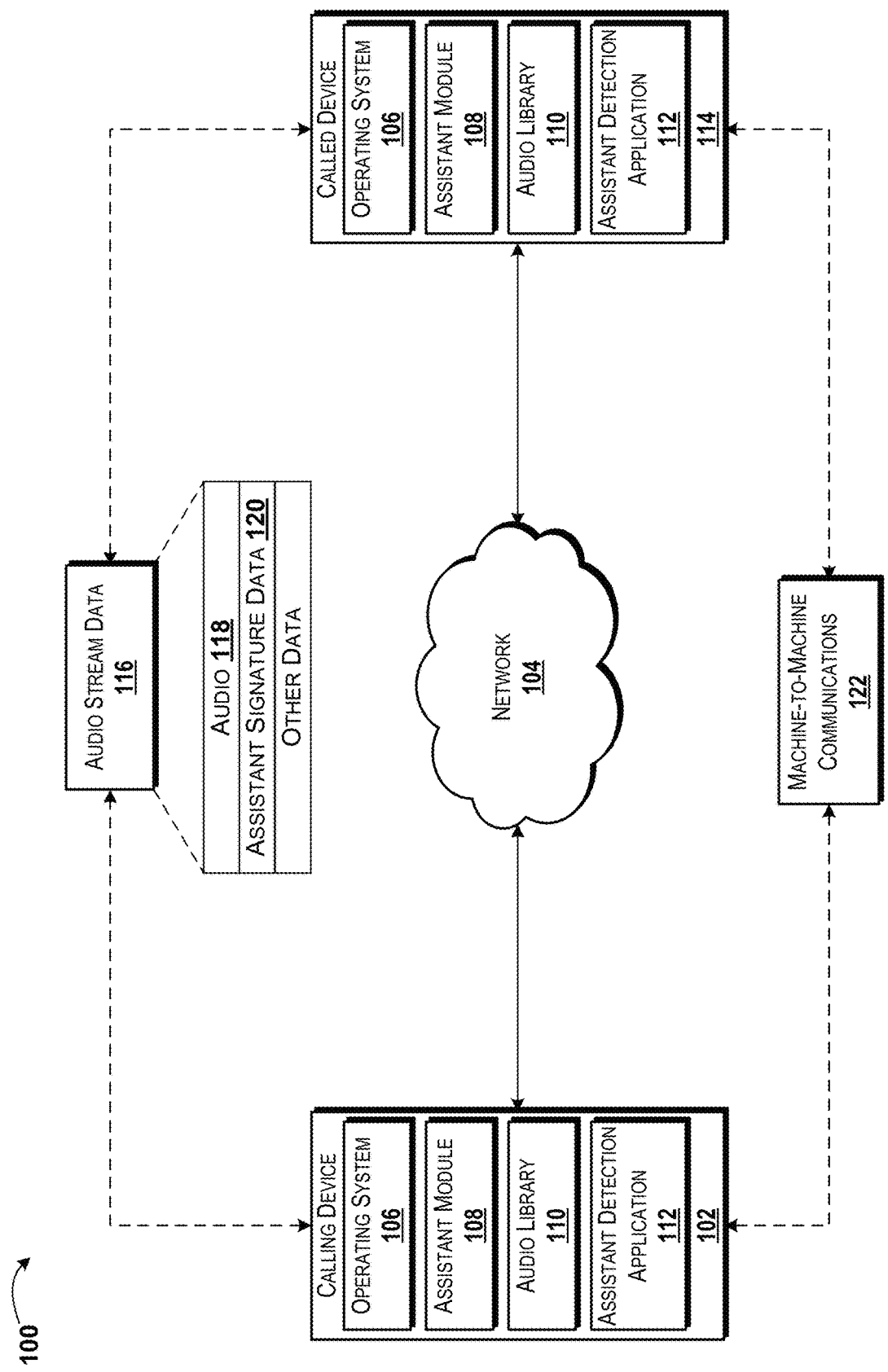
FIG. 1 is a system diagram illustrating an illustrative operating environment for various embodiments of the concepts and technologies described herein.

The following detailed description is directed to enabling machine-to-machine communication for digital assistants.

Two devices may initiate or join a call. For example, a calling device and a called device may be joined to a call. The calling device and the called device may communicate, at least in part, using a digital assistant, which may be provided by execution of one or more instances of the assistant module. The digital assistant may be configured to conduct communications using spoken commands and/or prompts such as phrases, words, or the like. These and/or other audio may be exchanged between the calling device and the called device as the audio stream data. It should be understood that this example is illustrative, and therefore should not be construed as being limiting in any way.

According to various embodiments of the concepts and technologies disclosed herein, the calling device and the called device can be configured to execute an instance of the assistant detection application to indicate to other parties that a digital assistant is conducting communications in the call on its behalf; and/or detect that a digital assistant is conducting communications in the call on behalf of the other party. It should be understood that this example is illustrative, and therefore should not be construed as being limiting in any way.

According to various embodiments of the concepts and technologies disclosed herein, the assistant detection application can be configured to include, in the audio stream data, assistant signature data that can include one or more tones or sounds; or modifications to bit strings associated with the audio stream data to indicate that a digital assistant is communicating. In some other embodiments, the assistant detection application can be configured to include, in the audio stream data, modified bits of bit strings and/or other data included in the audio stream data to indicate that a digital assistant is communicating. It should be understood that this example is illustrative, and therefore should not be construed as being limiting in any way.

The other party to the call can receive the audio stream data and analyze the audio for one or more instances of the assistant signature data, which can be included in the audio stream data. If the assistant signature data is detected, which can indicate that both parties to the call or conversation are digital assistants, the digital assistants can switch from a conversation using audible commands and/or requests to machine-to-machine communications. According to various embodiments of the concepts and technologies disclosed herein, machine-to-machine communications may be quicker and more efficient than spoken communications, and therefore can be used by the digital assistants to save resources. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for enabling machine-to-machine communication for digital assistants will be described, according to an illustrative embodiment. The operating environment 100 shown in FIG. 1 includes a calling device 102. The calling device 102 can operate in communication with and/or as part of a communications network ("network") 104, though this is not necessarily the case in all embodiments.

According to various embodiments, the functionality of the calling device 102 may be provided by one or more server computers, desktop computers, mobile telephones, smartphones, laptop computers, set-top boxes, other computing systems, and the like. It should be understood that the functionality of the calling device 102 may be provided by a single device, by two or more similar devices, and/or by two or more dissimilar devices. For purposes of describing the concepts and technologies disclosed herein, the calling device 102 is described herein as a smartphone. It should be understood that this embodiment is illustrative, and should not be construed as being limiting in any way.

The calling device 102 can execute an operating system 106 and one or more application programs such as, for example, an assistant module 108 and/or an assistant detection application 112. The operating system 106 can include a computer program that can control the operation of the calling device 102. The application programs can include one or more executable programs that can be configured to execute on top of the operating system 106 to provide various functions for the calling device 102 (or other devices) including the functionality illustrated and described herein for providing a digital assistant and/or the functionality illustrated and described herein for enabling machine-to-machine communications for digital assistants.

In particular, the assistant module 108 can be configured to provide functionality associated with a digital assistant (which may also be known and/or referred to as a predictive chatbot, a bot, and/or other terms or phrases). As is generally understood, a digital assistant can provide a user or other entity with various functionality typically associated with a secretary or assistant, with these functionality being provided by the digital assistant autonomously, based on interactions and/or commands or input from a user or other entity, and/or by way of artificial intelligence that may be provided via execution of various software programs, applications, routines, modules, combinations thereof, or the like. A user may, for example, ask a digital assistant to make a dinner reservation with a particular restaurant and the digital assistant can be configured to place a call to the restaurant and converse with a human or interactive voice response ("IVR") system to make the requested reservation. It should be understood that this example is illustrative, and therefore should not be construed as being limiting in any way.

According to various embodiments of the concepts and technologies disclosed herein, the calling device 102 can also store an audio library 110. The audio library 110 can include one or more voice samples (e.g., recordings of voices saying various words, letters, phrases, or the like), one or more voice generators (e.g., programs, routines, modules, or the like for generating voices), recorded tones (e.g., tones at various frequencies), tone generators for generating tones or sounds at various frequencies, other sounds, combinations thereof, or the like. The audio library 110 can include any audio and/or applications for generating audio during a call and/or at other times. Thus, in some embodiments the assistant module 108 can access the audio library 110 to create data to be used during a call and/or at other times. It should be understood that this example is illustrative, and therefore should not be construed as being limiting in any way.

The assistant detection application 112 can be configured to determine, during a conversation (e.g., a phone call) and/or at other times, if one or more other parties to the call corresponds to a digital assistant. In particular, a call between two digital assistants (e.g., a first digital assistant associated with the calling device 102 and a second digital assistant associated with the called device 114) may occur, yet in some instances the digital assistants may be unaware that the other party to the call is another digital assistant, and therefore may communicate using audible audio. In a contemplated embodiment of the concepts and technologies disclosed herein, a digital assistant of a first party (e.g., a calling device 102) can participate in a call with another device (e.g., a called device 114) using spoken audio for example, while machine-to-machine communications would enable a quicker interaction than using spoken audio. It should be understood that this example is illustrative, and therefore should not be construed as being limiting in any way.

According to various embodiments, the functionality of the called device 114 illustrated and described herein can be substantially similar (or even identical) to the functionality of the calling device 102, and therefore it can be appreciated, as shown in FIG. 1, that the called device 114 can include programs that are similar or even identical to the operating system 106, the assistant module 108, the audio library 110, and the assistant detection application 112 shown with respect to the calling device 102. Thus, FIG. 1 illustrates the same applications being executed by the called device 114. It should be understood that this example is illustrative, and therefore should not be construed as being limiting in any way.

According to various embodiments, the functionality of the called device 114 may be provided by one or more server computers, desktop computers, mobile telephones, smartphones, laptop computers, set-top boxes, other computing systems, and the like. It should be understood that the functionality of the called device 114 may be provided by a single device, by two or more similar devices, and/or by two or more dissimilar devices. For purposes of describing the concepts and technologies disclosed herein, the called device 114 is described herein as a smartphone. It should be understood that this embodiment is illustrative, and should not be construed as being limiting in any way.

During various calls, e.g., between a calling device 102 and a called device 114, a conversation can be conducted between a digital assistant (e.g., provided by execution of the assistant module 108 at the calling device 102) and another party using the called device 114 such as another digital assistant, which can be provided by execution of the assistant module 108 or a similar application or module at the called device 114. In some embodiments, the other party (with which the digital assistant conducts a conversation) can be a human, while in some other embodiments, the other party with which the digital assistant conducts the conversation may in fact be another digital assistant (e.g., provided by execution of the assistant module 108 executed by the called device 114). Because the calling device 102 and/or the called device 114 may be unaware that the other party to the conversation is a digital assistant, the conversation may continue in human (e.g., spoken and/or audible) language.

According to various embodiments of the concepts and technologies disclosed herein, however, the assistant detection application 112 can be configured to provide functionality to the calling device 102 and/or the called device 114 for recognizing that both parties to the conversation are digital assistants. Furthermore, the assistant detection application 112 can be configured to cause the calling device 102 and the called device 114 to switch from using audible commands, input, and/or output during the call to using machine-to-machine communications and/or to trigger the same in the other party to the conversation. It should be understood that this embodiment is illustrative, and therefore should not be construed as being limiting in any way.

According to various embodiments of the concepts and technologies disclosed herein, the assistant detection application 112 can also be configured to modify audio exchanged during the call (e.g., the audio stream data 116 shown in FIG. 1) to enable detection of the digital assistant by the other party to the call (or others). As shown in FIG. 1, the audio stream data 116 can include audio 118, assistant signature data 120, other data, and/or the like. Because information and/or data can be included in the audio stream data 116, it should be understood that the illustrated embodiment is illustrative and should not be construed as being limiting in any way.

The audio 118 can include one or more portions of audio (e.g., obtained from the audio library 110, generated by the calling device 102 or the called device 114, or the like) that may be perceptible and/or audible to a human being (if on the call). Thus, the audio 118 can include letters, numbers, words, phrases, music, or the like; which may be generated by the assistant module 108 and/or obtained from the audio library 110 in various embodiments. It should be appreciated that the audio 118 in its unmodified form may be the portion of the audio stream data 116 that a person and/or digital assistant would hear, interpret, and/or with which the person and/or digital assistant will interact with the other party. It should be understood that this example is illustrative, and therefore should not be construed as being limiting in any way.

The assistant signature data 120 can include one or more instances of data that may be configured to inform a device (e.g., the calling device 102 and/or the called device 114) or other entity (e.g., the assistant detection application 112, an IVR application, or the like) that a digital assistant is involved in a conversation occurring (e.g., during a call). The concepts and technologies disclosed herein include various embodiments of the assistant signature data 120, as will be illustrated and described in more detail herein.

In particular, according to various embodiments of the concepts and technologies disclosed herein, the assistant signature data 120 can include one or more tones, sounds, or combinations of tones and sounds that may be interpreted by the assistant detection application 112 as indicating that a party to the conversation is a digital assistant, but may be inaudible to a human, thereby ensuring that a call with a human will not be interrupted by the assistant signature data 120. In various embodiments, the one or more tones or sounds (or combinations of tones or sounds) may be inaudible to a human. For example, tones or sounds at some frequencies may not be audible to the average human (e.g., tones at frequencies below approximately twenty Hz and/or frequencies above approximately twenty kHz may generally be inaudible to humans) or the average adult human (e.g., tones or sounds at frequencies below approximately twenty Hz and/or frequencies above approximately seventeen kHz may be inaudible to the average adult human). In yet other embodiments, the tones or sounds may be designed to be inaudible to humans and some animals such as household pets such as dogs or cats (e.g., tones or sounds at frequencies below approximately twenty Hz and/or frequencies above approximately sixty-five kHz may be inaudible to most cats and dogs). Because the frequencies can be selected for various purposes, and may or may not be inaudible to humans or animals, it should be understood that these examples are illustrative, and therefore should not be construed as being limiting in any way.

Additionally, or alternatively, the assistant signature data 120 can be indicated using modified versions of one or more bits or bit strings that can correspond to part or all of the audio stream data 116 and/or a component thereof (e.g., the audio 118, a header of a packet, or the like). In some embodiments of the concepts and technologies disclosed herein, the assistant detection application 112 can be configured to modify the bits, bit strings, and/or other representations of data included in the audio stream data 116. In some contemplated embodiments, for example, one or more bits of one or more bit strings can be modified in a manner that can be detected by the assistant detection application 112 and used to indicate that a digital assistant is involved in the call or conversation, without changing the audio enough to be detected by a human. It should be understood that this example is illustrative, and therefore should not be construed as being limiting in any way.

For example, in some embodiments the assistant detection application 112 can modify one or more least significant bits of one or more bit strings or the like to have a specific value (and/or values) that, when detected by the assistant detection application 112, may be interpreted to indicate and/or correspond to the assistant signature data 120. In some embodiments, some, all, or none of the least significant bits of one or more bit strings may be forced to a specific value (e.g., a one or a zero), and this may be interpreted by the assistant detection application 112 to represent the assistant signature data 120. Namely, because a last bit of multiple bit strings could be expected to end approximately fifty percent of the time in a zero and fifty percent of the time in a one, forcing all or a majority of the least significant bits to all have the same value would be unexpected and therefore can indicate that these digits have been forced to that value (e.g., to act as the assistant signature data 120). Because other methods of detecting the assistant signature data 120 are possible and are contemplated, it should be understood that these examples are illustrative, and therefore should not be construed as being limiting in any way.

The other data can include other information that may be included in the audio stream data 116 such as setup commands (e.g., messages in session initialization protocol ("SIP"), headers, and/or other information). These and/or other information may be included in the audio stream data 116 for various purposes. It should be understood that this example is illustrative, and therefore should not be construed as being limiting in any way.

In practice, two devices may initiate a call. For example, a calling device 102 and a called device 114 may be joined to a call. The calling device 102 and the called device 114 may communicate, at least in part, using a digital assistant, which may be provided by execution of one or more instances of the assistant module 108. The digital assistant may be configured to conduct communications using spoken commands and/or prompts such as phrases, words, or the like. It should be understood that the spoken commands may be obtained from the audio library 110 as recordings, or may be generated based on a voice generator that can be obtained from the audio library 110 or elsewhere. These and/or other audio may be exchanged between the calling device 102 and the called device 114 as the audio stream data 116. It should be understood that this example is illustrative, and therefore should not be construed as being limiting in any way.

According to various embodiments of the concepts and technologies disclosed herein, the calling device 102 and the called device 114 can be configured to execute an instance of the assistant detection application 112 to indicate to other parties that a digital assistant is conducting communications in the call on its behalf; and/or detect that a digital assistant is conducting communications in the call on behalf of the other party. It should be understood that this example is illustrative, and therefore should not be construed as being limiting in any way.

According to various embodiments of the concepts and technologies disclosed herein, the assistant detection application 112 can be configured to include, in the audio stream data 116, assistant signature data 120 that can include one or more tones or sounds; or modifications to bit strings associated with the audio stream data 116 to indicate that a digital assistant is communicating. In some other embodiments, the assistant detection application 112 can be configured to include, in the audio stream data 116, modified bits of bit strings and/or other data included in the audio stream data 116 to indicate that a digital assistant is communicating. It should be understood that this example is illustrative, and therefore should not be construed as being limiting in any way.

The other party to the call can receive the audio stream data 116 and analyze the audio for one or more instances of the assistant signature data 120, which can be included in the audio stream data 116. If the assistant signature data 120 is detected, which can indicate that both parties to the call or conversation are digital assistants, the digital assistants can switch from a conversation using audible commands and/or requests to machine-to-machine communications 122. According to various embodiments of the concepts and technologies disclosed herein, machine-to-machine communications 122 may be quicker and more efficient than spoken communications, and therefore can be used by the digital assistants to save resources. It should be understood that this example is illustrative, and therefore should not be construed as being limiting in any way.

Although the assistant module 108 and the assistant detection application 112 are illustrated as separate components of the calling device 102 and the called device 114, it should be understood that the assistant module 108 and the assistant detection application 112 can be provide by a single application or module and/or that some aspects of these components may be embodied as or in stand-alone devices or components thereof operating as part of or in communication with the calling device 102, the network 104, and/or the called device 114. As such, the illustrated embodiment should be understood as being illustrative of only some contemplated embodiments and should not be construed as being limiting in any way.

FIG. 1 illustrates one calling device 102, one network 104, and one called device 114. It should be understood, however, that various implementations of the operating environment 100 can include one or more than one calling device 102; zero, one, or more than one network 104; and/or one or more than one called device 114. As such, the illustrated embodiment should be understood as being illustrative, and should not be construed as being limiting in any way.

Figure 2A:
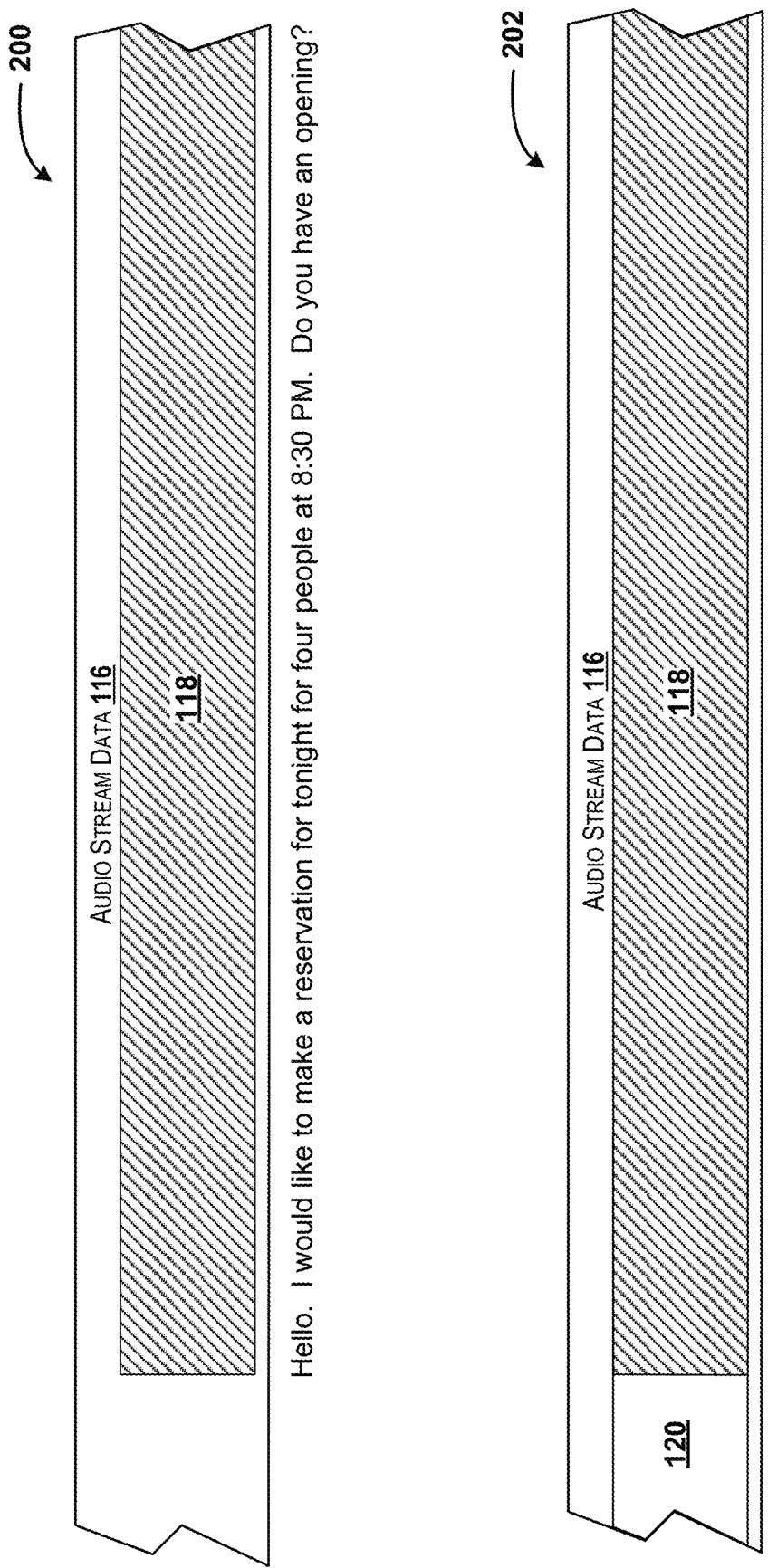

Turning now to FIG. 2A, additional aspects of the concepts and technologies disclosed herein will be described. In particular, FIG. 2A schematically illustrates an example of modifying audio associated with a call, for example by an assistant detection application 112. As shown in FIG. 2A, unmodified audio 200 can include an audio stream data 116 that can be associated with a call. The audio stream data 116 can include audio 118 such as, for example, a prompt, other spoken language, or the like. In the illustrated embodiment, the audio 118 is illustrated as corresponding to a request to make a dinner reservation. It should be understood that this example is illustrative, and therefore should not be construed as being limiting in any way.

As shown in FIG. 2A, some embodiments of the concepts and technologies disclosed herein can include modifying data associated with the audio stream data 116 to obtain the modified audio 202. The modified audio 202 can similarly include the audio 118 as included in the unmodified audio 200. According to various implementations, the audio 118 included in the modified audio 202 can be similar or even identical to the audio 118 included in the unmodified audio 200. In the illustrated embodiment, the audio 118 included in the modified audio 202 is identical to the audio 118 included in the unmodified audio 200. It should be understood that this example is illustrative, and therefore should not be construed as being limiting in any way.

As shown in FIG. 2A, the modified audio 202 also can include the assistant signature data 120. In some embodiments, as illustrated in FIG. 2A, the assistant signature data 120 can include one or more sounds at one or more frequencies. In some embodiments, the one or more sounds and one or more frequencies are configured such that the assistant signature data 120 is inaudible to many, most, or all humans and/or many animals including cats and dogs. For example, in some embodiments the assistant signature data 120 may include one or more tones having frequencies under about twenty Hz (i.e., the minimum frequency the average human can hear) and/or above about twenty kHz (i.e., the maximum frequency the average human can hear). In some embodiments, the assistant signature data 120 may have a frequency above about sixty-five kHz so that the sound will be above the audible range of dogs and cats as well. It should be understood that this example is illustrative, and therefore should not be construed as being limiting in any way.

As such, it can be appreciated that the assistant signature data 120, if played during a call with a human (or heard by a pet via a call on speaker phone for example), may not be noticed and therefore can be inobtrusive to the conversation if one of the parties is a human. If the assistant signature data 120 is played during a call with a digital assistant, however, the digital assistant may detect the assistant signature data 120 in some embodiments. It should be understood that these example uses of the assistant signature data 120 are illustrative, and therefore should not be construed as being limiting in any way.

Turning now to FIG. 2B, additional aspects of the concepts and technologies disclosed herein will be described. In particular, FIG. 2B schematically illustrates another example of modifying audio associated with a call, for example by an assistant detection application 112. As shown in FIG. 2B, unmodified audio 200 can include an audio stream data 116 that can be associated with a call. The audio stream data 116 shown in FIG. 2B can be substantially similar, or even identical, to the audio stream data 116 illustrated and described above with reference to FIG. 2A, though this is not necessarily the case in all embodiments. In the illustrated embodiment, the audio stream data 116 can include audio 118 such as, for example, a prompt, other spoken language, or the like. In the illustrated embodiment, the audio 118 could correspond to a request to make a dinner reservation as illustrated and described above with reference to FIG. 2A. It should be understood that this example is illustrative, and therefore should not be construed as being limiting in any way.

As shown in FIG. 2B, the audio stream data 116 can be provided by and/or can include, in some embodiments, one or more bit strings 204A-N (hereinafter collectively and/or generically referred to as "bit strings 204"). As is generally understood, a string of bits such as the bit strings 204 (e.g., bits formatted in binary) can represent data including audio such as the audio 118. In some embodiments, an audio stream such as the audio stream data 116 can include any number of bit strings 204 to represent audio associated with the assistant signature data 120. As shown in FIG. 2B, the values associated with the bit strings 204 can include various combinations of the ones and zeroes. It can be appreciated with reference to FIG. 2B that the values of the respective bit strings 204 (illustrated in FIG. 2B below the bit strings 204) can include eight bits and can have a least significant bit in the eight digit position. It should be understood that the length of the bit strings 204 and the values thereof are illustrative, and therefore should not be construed as being limiting in any way.

As shown in FIG. 2B, some embodiments of the concepts and technologies disclosed herein can include modifying data associated with the audio stream data 116 (e.g., the audio 118) to obtain the modified audio 202. In the illustrated embodiment shown in FIG. 2B, modifying the audio 118 can include modifying some or all of the least significant bits of the respective bit strings 204 to obtain modified bit strings 206A-N (hereinafter collectively and/or generically referred to as "modified bit strings 206"). It should be understood that this example is illustrative, and therefore should not be construed as being limiting in any way.

In the illustrated embodiment, the least significant bits of the respective bit strings 204 can include forcing the value of the least significant bits to a one or a zero. It should be understood that this example is illustrative, and therefore should not be construed as being limiting in any way. In FIG. 2B, it can be appreciated that the value of the least significant bit of the bit string 204B can originally be set to zero, and therefore it can be appreciated that the modified audio 202 can include the bit string 204B (in unmodified form) as no change must be made to that bit string 204B in the illustrated embodiment. It should be understood that this example is illustrative, and therefore should not be construed as being limiting in any way.

As shown in FIG. 2B, the modified audio 202 can include the assistant signature data 120. In some embodiments, as illustrated in FIG. 2B, the assistant signature data 120 can include the same data that provides the audio 118, namely the modified bit strings 206 and the bit string 204B. In some embodiments, the modification of the least significant bit of the bit strings 204 may result in modified audio 202 that sounds very similar to, or even identical to, the unmodified audio 200. The statistical likelihood, however, of all bit strings 204 and/or modified bit strings 206 ending with the same least significant bit (e.g., a one or a zero) may be very small and therefore can be understood by a calling device 102 and/or called device 114 as indicating the representation of the assistant signature data 120. Thus, forcing the least significant bits of the bit strings 204 and/or modified bit strings 206 to uniformly have a value of a particular value may indicate that a digital assistant is making the call. It should be understood that these example uses of the assistant signature data 120 are illustrative, and therefore should not be construed as being limiting in any way.

In some embodiments of the concepts and technologies disclosed herein, the least significant bits of the bit strings 204, or other bits of the bit strings 204, can be changed to other values (and not necessarily forced to the same value of one or zero). In some embodiments, a number of bit strings 204 in a row (or alternate bit strings 204) may be analyzed and a particular bit of the bit strings 204 may be examined (e.g., the least significant bit). The value of the particular bit(s) of the bit string(s) 204 may indicate other data (e.g., a command, a word, a file, or the like). Thus, it should be appreciated that the changing of bits of the bit strings 204 can be accomplished in a number of manners and/or may have different results.

Figure 3:
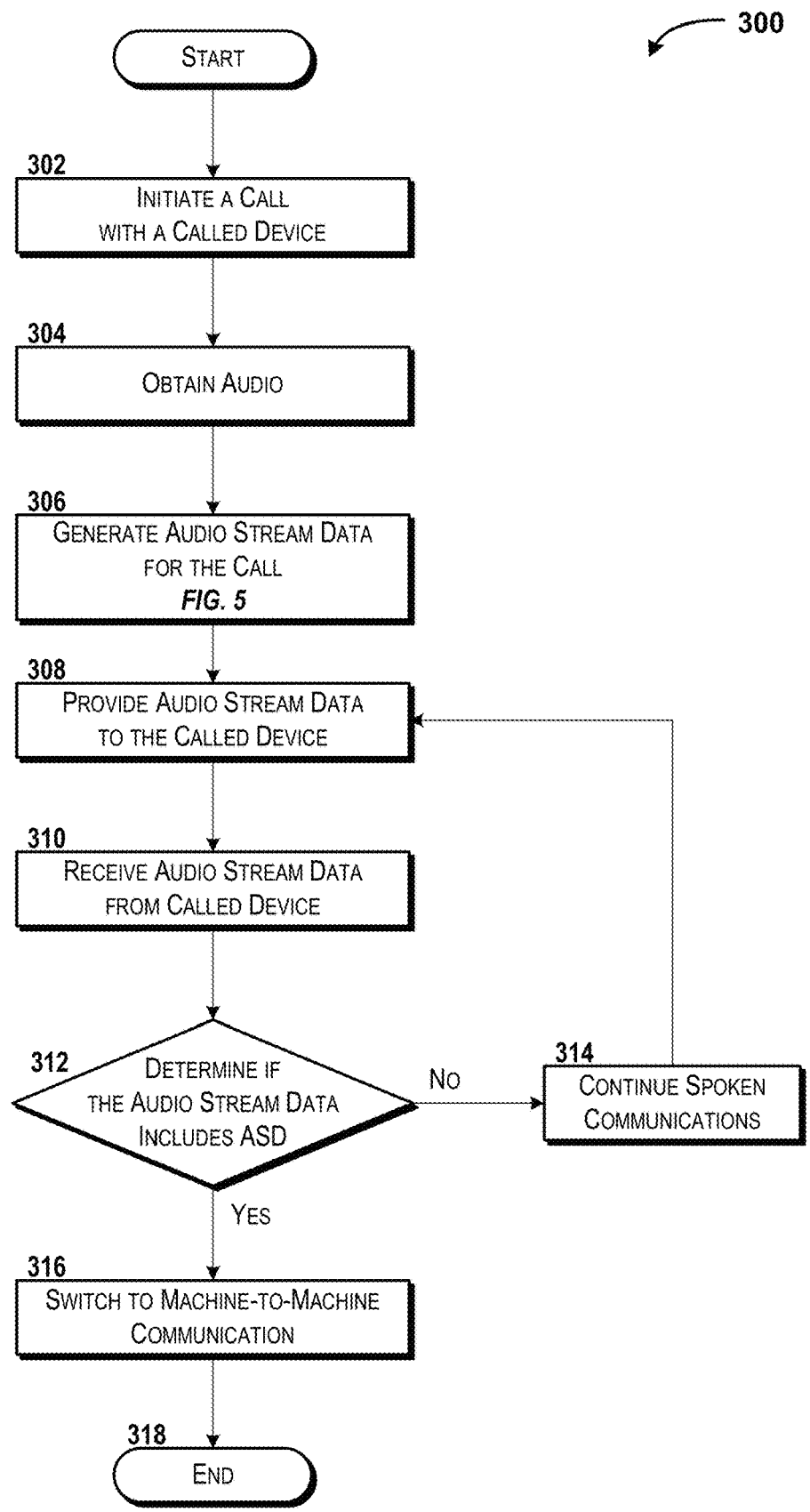
FIG. 3 is a flow diagram showing aspects of a method for enabling machine-to-machine communication for digital assistants at a calling device, according to an illustrative embodiment of the concepts and technologies described herein.

Turning now to FIG. 3, aspects of a method 300 for enabling machine-to-machine communication for digital assistants at a calling device 102 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the calling device 102 and/or the called device 114, to perform one or more operations and/or causing the processor to direct other components of the computing system or device to perform one or more of the operations.

For purposes of illustrating and describing the concepts of the present disclosure, the method 300 is described herein as being performed by the calling device 102 via execution of one or more software modules such as, for example, the assistant module 108 and/or the assistant detection application 112. It should be understood that additional and/or alternative devices and/or network nodes (e.g., the called device 114) can provide the functionality described herein via execution of one or more modules, applications, and/or other software including, but not limited to, the assistant module 108 and/or the assistant detection application 112. Thus, the illustrated embodiments are illustrative, and should not be viewed as being limiting in any way.

The method 300 begins at operation 302. At operation 302, the calling device 102 can initiate a call with a called device 114. Of course, the initiation of a call between two devices can be accomplished in a number of manners, depending on whether the phone call is made via a data connection, a voice connection, or the like. Furthermore, it should be understood that calling device 102 can be connected to the called device 114 via various other devices and/or functionality (e.g., a conference line could connect the two devices together for a call; a session could be created for the call as part of an existing or new data connection; combinations thereof; or the like). Furthermore, more than two parties may join any particular call, and the functionality illustrated and described herein can be used in association with such calls as well. As such, the example embodiment shown in FIG. 3, wherein a calling device 102 initiates a call with the called device 114 is illustrative of one embodiment and should not be construed as being limiting in any way.

From operation 302, the method 300 can proceed to operation 304. At operation 304, the calling device 102 can obtain audio such as the audio 118 illustrated and described with reference to FIG. 1. Thus, operation 304 can include, in some embodiments, the calling device 102 retrieving, e.g., from the audio library 110, one or more prompts, voice generators, scripts, or the like, for a phone call. In some embodiments of the concepts and technologies disclosed herein, operation 304 also can include obtaining and/or generating an assistant signature data 120 for inclusion in call audio. It should be understood that this example is illustrative, and therefore should not be construed as being limiting in any way.

From operation 304, the method 300 can proceed to operation 306. At operation 306, the calling device 102 can generate audio stream data 116 for the call. In various embodiments, generating the audio stream data 116 can include generating (or obtaining) the audio 118. In some embodiments, generating the audio stream data 116 also can include generating and/or obtaining the assistant signature data 120 such as generating tones or sounds, modifying bit strings, combinations thereof, or the like. Because the audio stream data 116 can include other data, it should be understood that operation 306 can include generating and/or obtaining other data from various sources and creating the audio stream data 116. Also, it should be understood that operation 306 can include generating spoken language audio (e.g., using a voice generator or other functionality). It should be understood that this example is illustrative, and therefore should not be construed as being limiting in any way.

From operation 306, the method 300 can proceed to operation 308. At operation 308, the calling device 102 can provide the audio stream data 116 to the called device 114. In various embodiments, the calling device 102 can detect another party (e.g., the called device 114) joining (e.g., answering) the call and/or saying "hello," or the like, and can provide the audio stream data 116 in response to detecting the other person or device joining the call. Because the calling device 102 can provide the audio stream data 116 to the called device 114 at additional and/or alternative times, it should be understood that the above examples are illustrative, and therefore should not be construed as being limiting in any way.

From operation 308, the method 300 can proceed to operation 310. At operation 310, the calling device 102 can receive audio stream data 116 from the called device 114. It can be appreciated that the calling device 102 and the called device 114 can exchange data such as the audio stream data 116 during a call, so operation 310 can correspond to the calling device 102 receiving audio from the called device 114. It should be understood that this example is illustrative, and therefore should not be construed as being limiting in any way.

From operation 310, the method 300 can proceed to operation 312. In operation 312, the calling device 102 can determine if the audio stream data 116 received in operation 310 includes the assistant signature data 120. According to various embodiments of the concepts and technologies disclosed herein, the calling device 102 (e.g., via execution of the assistant detection application 112) can analyze the audio received in operation 310 to determine if the assistant signature data 120 is present.

In some embodiments, as noted herein, the assistant signature data 120 can include one or more tones or sounds that may be inaudible to a human such as tones at certain frequencies (e.g., tones at frequencies below approximately twenty Hz and/or frequencies above approximately twenty kHz). Additionally, or alternatively, bit strings 204 or other representations of data included in the audio stream data 116 can be modified (e.g., by modifying least significant bits of respective bit strings 204 or the like) to indicate the assistant signature data 120. Thus, operation 312 can include determining if the least significant bits of respective bit strings 204 in the audio stream data 116 have been forced to certain values to represent the assistant signature data 120 in some embodiments; or if the audio stream data 116 includes one or more tones at one or more frequencies. Because other methods of detecting the assistant signature data 120 are possible and are contemplated, it should be understood that these examples are illustrative, and therefore should not be construed as being limiting in any way.

If the calling device 102 determines, in operation 312, that the audio stream data 116 received in operation 310 does not include the assistant signature data 120, the method 300 can proceed to operation 314, the spoken communications can be continued for the call, and flow of the method 300 can return to operation 308. Thus, it can be appreciated that operations 308-312 can be iterated, in some embodiments, until the calling device 102 determines, in any iteration of operation 312, that the audio stream data 116 received in operation 310 includes the assistant signature data 120. It should be understood that this example is illustrative, and therefore should not be construed as being limiting in any way.

If the calling device 102 determines, in operation 312, that the audio stream data 116 received in operation 310 includes the assistant signature data 120, the method 300 can proceed to operation 316. At operation 316, the calling device 102 can switch from spoken communications to machine-to-machine communications 122 with the called device 114. Thus, the calling device 102 and the called device 114 can be configured to communicate in machine-to-machine language (e.g., exchange of data packets, signals, etc.), which may occur much faster and much more effectively than spoken language, in some embodiments. It should be understood that this example is illustrative, and therefore should not be construed as being limiting in any way.

From operation 316, the method 300 can proceed to operation 318. The method 300 can end at operation 318.

Figure 4:
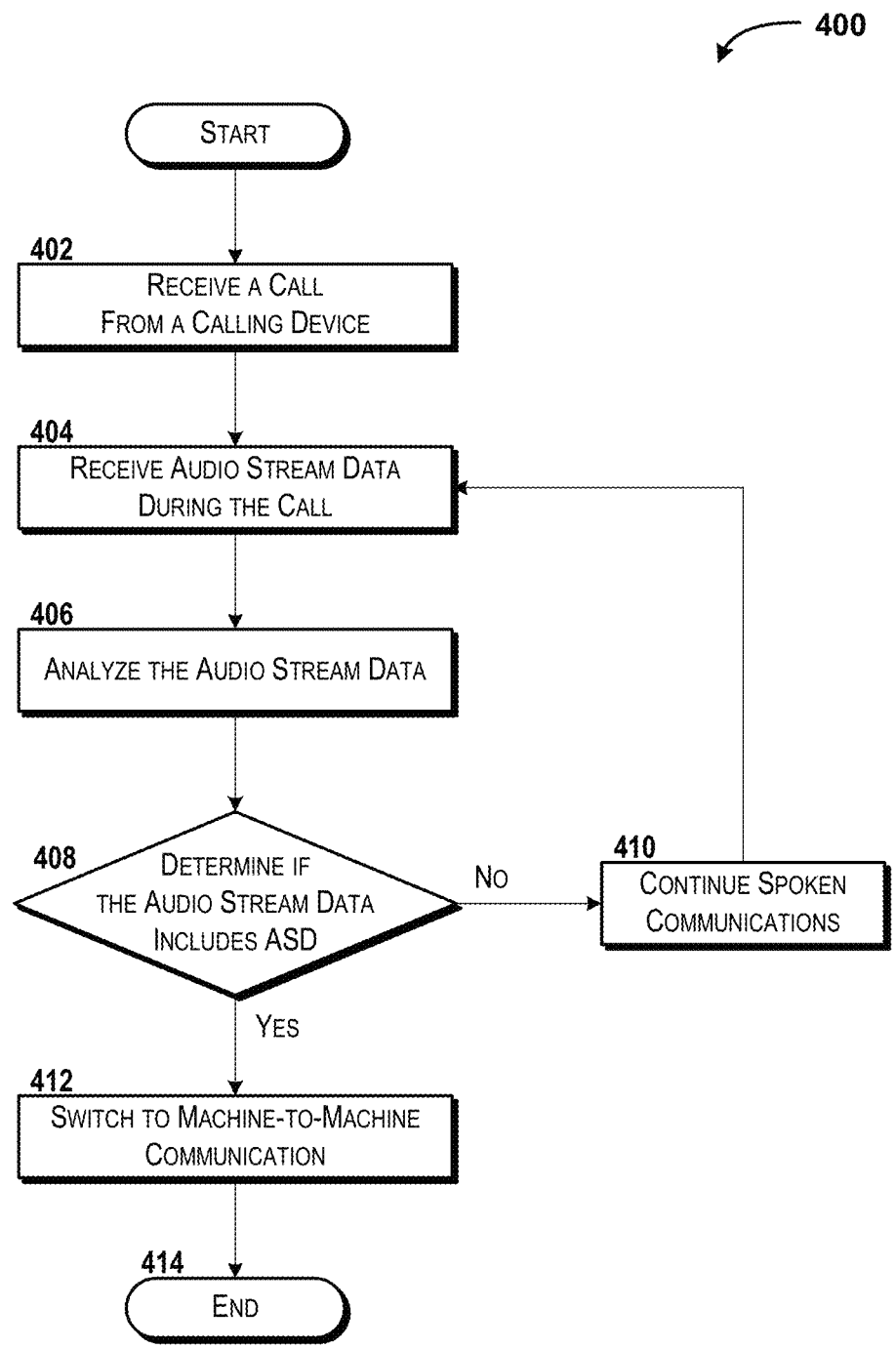
FIG. 4 is a flow diagram showing aspects of a method for enabling machine-to-machine communication for digital assistants at a called device, according to an illustrative embodiment of the concepts and technologies described herein.

Turning now to FIG. 4, aspects of a method 400 for enabling machine-to-machine communication for digital assistants at a called device 114 will be described in detail, according to an illustrative embodiment. For purposes of illustrating and describing the concepts of the present disclosure, the method 400 is described herein as being performed by the called device 114 via execution of one or more software modules such as, for example, the assistant module 108 and/or the assistant detection application 112. It should be understood that additional and/or alternative devices and/or network nodes (e.g., the calling device 102) can provide the functionality described herein via execution of one or more modules, applications, and/or other software including, but not limited to, the assistant module 108 and/or the assistant detection application 112. Thus, the illustrated embodiments are illustrative, and should not be viewed as being limiting in any way.

The method 400 begins at operation 402. At operation 402, the called device 114 can receive a call from the calling device 102. As explained above, it should be understood that the initiation of a call between the calling device 102 and the called device 114 can occur in a number of manners, depending on whether the phone call is made via a data connection, a voice connection, or the like. Furthermore, it should be understood that the called device 114 can be connected to the calling device 102 via various other devices and/or functionality (e.g., a conference line could connect the two devices together for a call; a session could be created for the call as part of an existing or new data connection; combinations thereof; or the like), and that more than two parties may be connected to a call, in some instances. As such, the example embodiment shown in FIG. 4, wherein a called device 114 receives a call from the calling device 102 is illustrative of one embodiment and should not be construed as being limiting in any way.

From operation 402, the method 400 can proceed to operation 404. At operation 404, the called device 114 can receive audio stream data 116 during the call. It can be appreciated that the calling device 102 and the called device 114 can exchange data such as the audio stream data 116 during a call, so operation 404 can correspond to the called device 114 receiving the audio stream data 116 from the calling device 102 at any time during the call. It should be understood that this example is illustrative, and therefore should not be construed as being limiting in any way.

From operation 404, the method 400 can proceed to operation 406. At operation 406, the called device 114 can analyze the audio stream data 116. From operation 406, the method 400 can proceed to operation 408. At operation 408, the called device 114 can determine, e.g., based on the analysis of operation 406, if the audio stream data 116 includes an assistant signature data 120. According to various embodiments of the concepts and technologies disclosed herein, the called device 114 (e.g., via execution of the assistant detection application 112) can analyze the audio stream data 116 received in operation 404 to determine if the assistant signature data 120 is present.

In some embodiments, as noted herein, the assistant signature data 120 can include one or more tones or sounds that may be inaudible to a human such as tones at certain frequencies (e.g., tones at frequencies below approximately twenty Hz and/or frequencies above approximately twenty kHz). Additionally, or alternatively, bit strings 204 or other representations of data included in the audio stream data 116 can be modified (e.g., by modifying least significant bits of respective bit strings 204 or the like) to indicate the assistant signature data 120. Thus, operation 408 can include determining if the least significant bits of respective bit strings 204 in the audio stream data 116 have been forced to certain values to represent the assistant signature data 120 in some embodiments; or if the audio stream data 116 includes one or more tones at one or more frequencies. Because other methods of detecting the assistant signature data 120 are possible and are contemplated, it should be understood that these examples are illustrative, and therefore should not be construed as being limiting in any way.

If the called device 114 determines, in operation 408, that the audio stream data 116 received in operation 404 does not include the assistant signature data 120, the method 400 can proceed to operation 410, the spoken communications can be continued for the call, and flow of the method 400 can return to operation 404. Thus, it can be appreciated that operations 404-408 can be iterated, in some embodiments, until the called device 114 determines, in any iteration of operation 408, that the audio stream data 116 received in operation 404 includes the assistant signature data 120. It should be understood that this example is illustrative, and therefore should not be construed as being limiting in any way.

If the called device 114 determines, in operation 408, that the audio stream data 116 received in operation 404 includes the assistant signature data 120, the method 400 can proceed to operation 412. At operation 412, the called device 114 can switch from spoken communications to machine-to-machine communications 122 with the calling device 102. Thus, the calling device 102 and the called device 114 can be configured to communicate in machine-to-machine communications 122 (e.g., exchange of data; signaling, etc.), which may occur much faster and much more effectively than spoken language, in some embodiments. It should be understood that this example is illustrative, and therefore should not be construed as being limiting in any way.

From operation 412, the method 400 can proceed to operation 414. The method 400 can end at operation 414.

Figure 5:
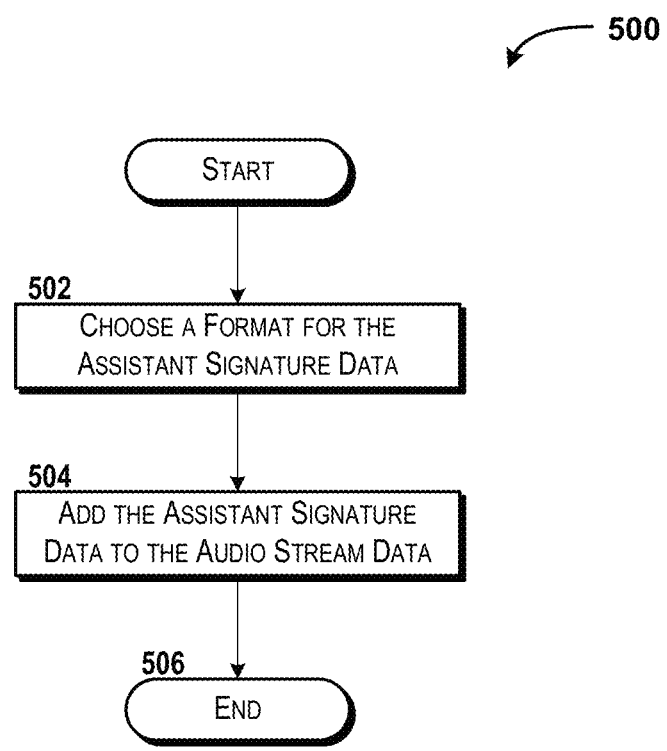
FIG. 5 is a flow diagram showing aspects of a method for modifying audio stream data to enable machine-to-machine communication for digital assistants, according to an illustrative embodiment of the concepts and technologies described herein.

Turning now to FIG. 5, aspects of a method 500 for modifying audio stream data 116 to enable machine-to-machine communication for digital assistants will be described in detail, according to an illustrative embodiment. For purposes of illustrating and describing the concepts of the present disclosure, the method 500 is described herein as being performed by the calling device 102 via execution of one or more software modules such as, for example, the assistant module 108 and/or the assistant detection application 112. It should be understood that additional and/or alternative devices and/or network nodes (e.g., the called device 114) can provide the functionality described herein via execution of one or more modules, applications, and/or other software including, but not limited to, the assistant module 108 and/or the assistant detection application 112. Thus, the illustrated embodiments are illustrative, and should not be viewed as being limiting in any way.

The method 500 begins at operation 502. At operation 502, the calling device 102 can choose a format to use for the assistant signature data 120. In some embodiments, the format may be set by preferences or settings, and therefore may not be "chosen" as such. In some other embodiments the calling device 102 may determine which format to used based on various considerations such as, for example, processing power, available bandwidth and/or other connection properties (e.g., audio quality, background noise, and/or call clarity for example, if tones or sounds are to be used; data channel consistency and/or clarity, for example, if bit string modifications are to be used; or the like), combinations thereof, or the like.

In some embodiments, as noted herein, the assistant signature data 120 can include one or more tones or sounds that may be inaudible to a human such as tones at certain frequencies (e.g., tones at frequencies below approximately twenty Hz and/or frequencies above approximately twenty kHz). As such, operation 502 can correspond to the calling device 102 determining that one or more tones, sounds, or the like are to be included in the audio stream data 116 to function as the assistant signature data 120. It should be understood that this example is illustrative, and therefore should not be construed as being limiting in any way.

Additionally, or alternatively, the assistant signature data 120 can be provided by certain values in one or more bit strings 204 or other representations of data included in the audio stream data 116. For example, as noted above, the least significant bits of one or more bit strings 204 or other data representations of audio can be modified, in some embodiments. For example, some embodiments include forcing the least significant bits of one or more bit strings 204 to a zero or a one (if using binary) or other specific value to indicate the assistant signature data 120. In some other embodiments, other portions of data can be modified to act as the assistant signature data 120. Because other methods of detecting the assistant signature data 120 are possible and are contemplated, it should be understood that these examples are illustrative, and therefore should not be construed as being limiting in any way.

From operation 502, the method 500 can proceed to operation 504. At operation 504, the calling device 102 can add assistant signature data 120 to the audio stream data 116. Thus, operation 504 can include and/or correspond to the calling device 102 adding sounds, tones, or the like to the audio stream data 116 to function as the assistant signature data 120. In some other embodiments, operation 504 can include and/or correspond to the calling device 102 modifying one or more bit strings 204 of the audio stream data 116 such as, for example, by forcing certain bits in one or more of the bit strings 204 to have a certain value, a certain pattern of values, a certain distribution of values (e.g., seventy-five percent ones or zeroes, every other string a one or zero, or the like), or other values. Because the assistant signature data 120 can be provided in additional and/or alternative manners, it should be understood that the above examples are illustrative and should not be construed as being limiting in any way.

While the above description has discussed forcing least significant bits of bit strings 204 to a certain value (e.g., ones or zeroes), it can be appreciated from the above paragraph that any particular pattern may be statistically unlikely as one would expect binary bit strings 204 of audio to have a value of one for the least significant bits approximately fifty percent of the time, and to have a value of zero for the least significant bits approximately fifty percent of the time. As such, modification of the bit strings 204 such that the values of the least significant bits (which may be chosen so as to minimize the impact on the audio and make the changes less detectable to a human) of the bit strings 204 have more than a threshold percentage of any particular value (e.g., a threshold of sixty percent is used in some embodiments) may be used to indicate the assistant signature data 120. In some other embodiments, a pattern of least significant bits may be used (e.g., every other least significant bit may be forced to zero or one, ten least significant bits in a row of bit strings 204 may be forced to a value or pattern of values, etc.). As such, it should be understood that the concepts and technologies disclosed herein entail changing least significant bits of bit strings 204 in a manner that is statistically unlikely to occur naturally and therefore can be understood as corresponding to the assistant signature data 120. It should be understood that this example is illustrative, and therefore should not be construed as being limiting in any way.

From operation 504, the method 500 can proceed to operation 506. The method 500 can end at operation 506.

Figure 6:
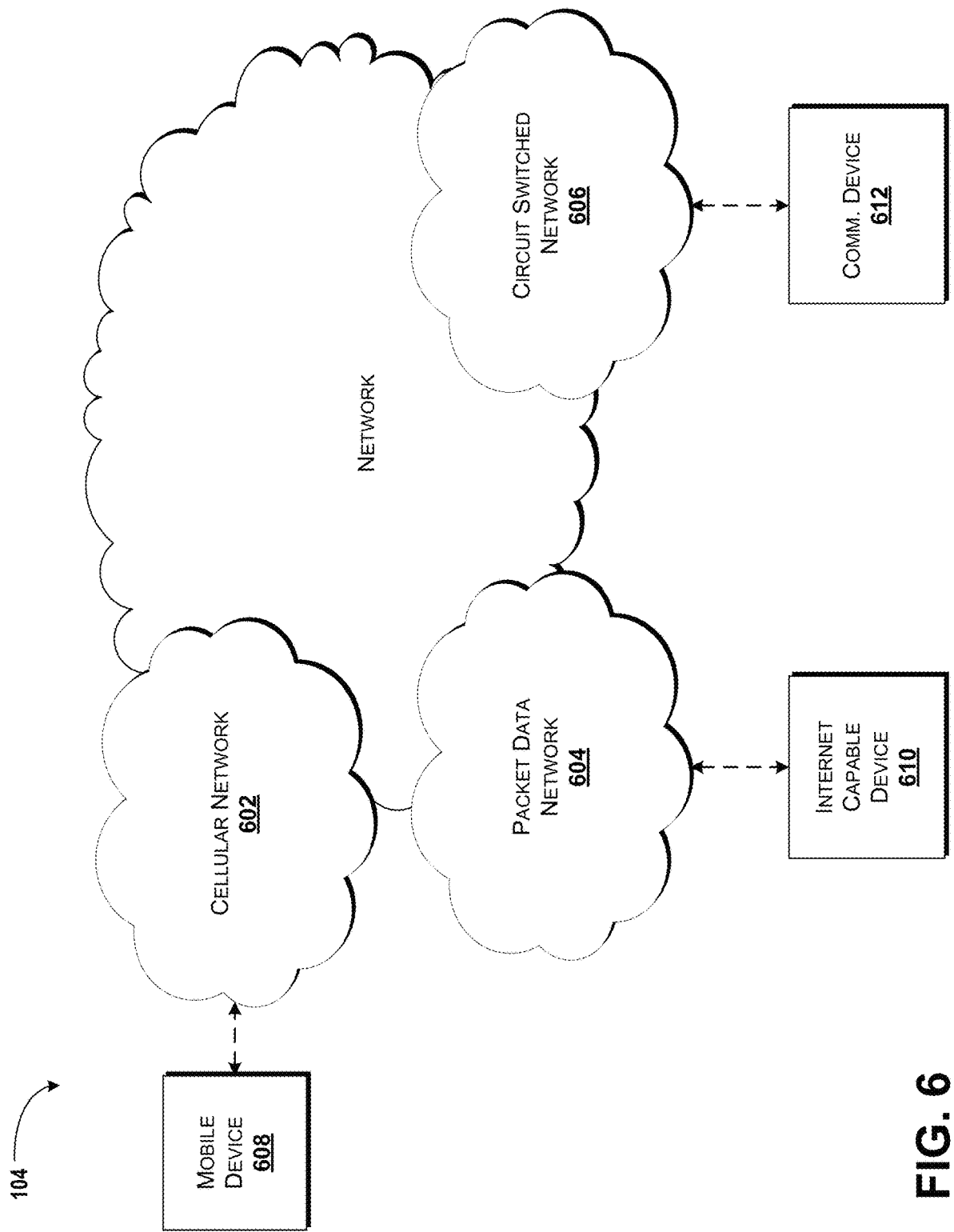
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606. A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards, 5G mobile communications standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
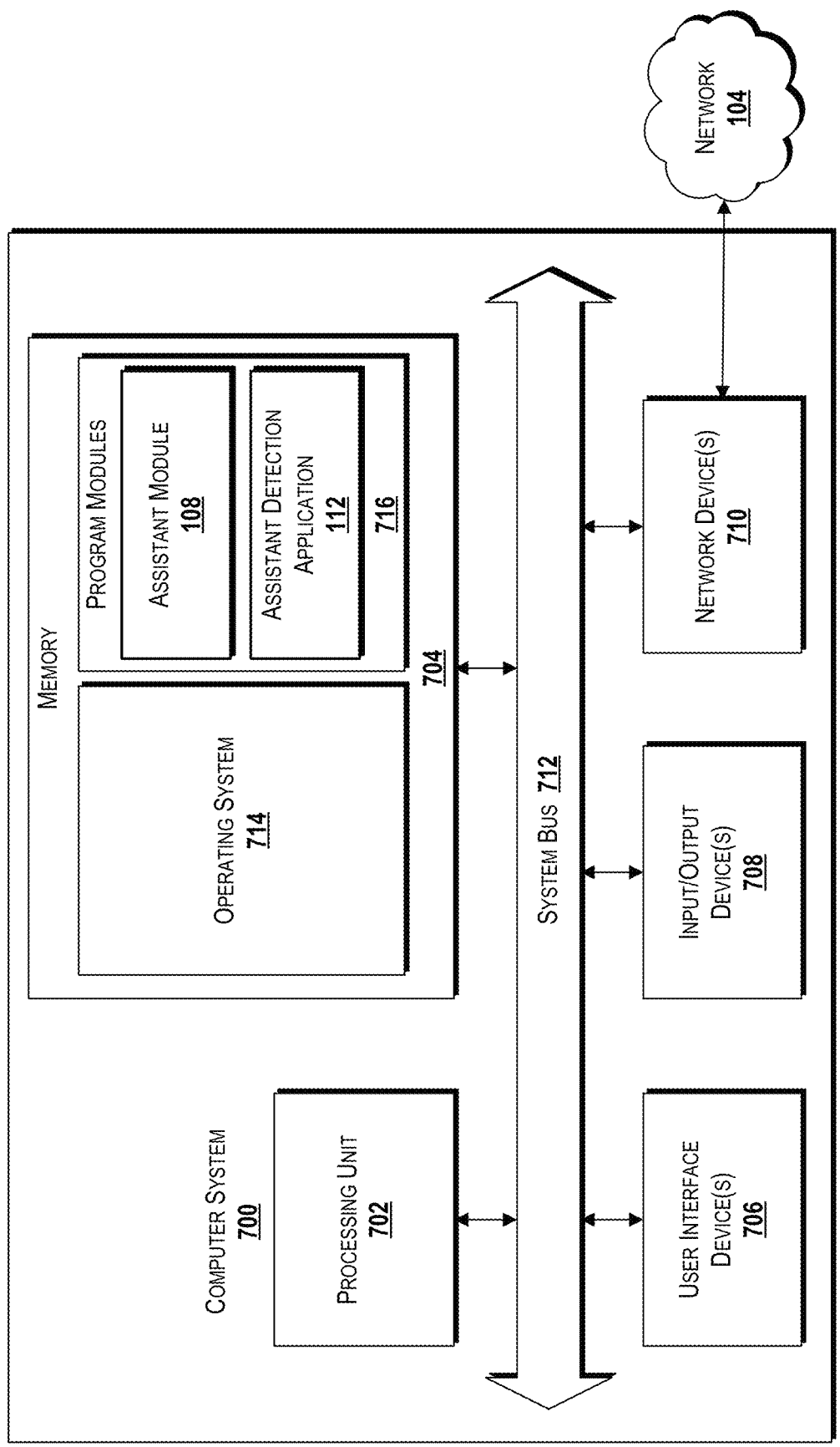
FIG. 7 is a block diagram illustrating an example computer system configured to enable machine-to-machine communication for digital assistants, according to some illustrative embodiments of the concepts and technologies described herein.

FIG. 7 is a block diagram illustrating a computer system 700 configured to provide the functionality described herein for enabling machine-to-machine communication for digital assistants, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the assistant module 108 and/or the assistant detection application 112. These and/or other programs can be embodied in computer-readable media containing instructions that, when executed by the processing unit 702, perform one or more of the methods 300, 400, and 500 described in detail above with respect to FIGS. 3-5 and/or other functionality as illustrated and described herein. It can be appreciated that, at least by virtue of the instructions embodying the methods 300, 400, 500, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the audio library 110, the audio stream data 116, the audio 118, the assistant signature data 120, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
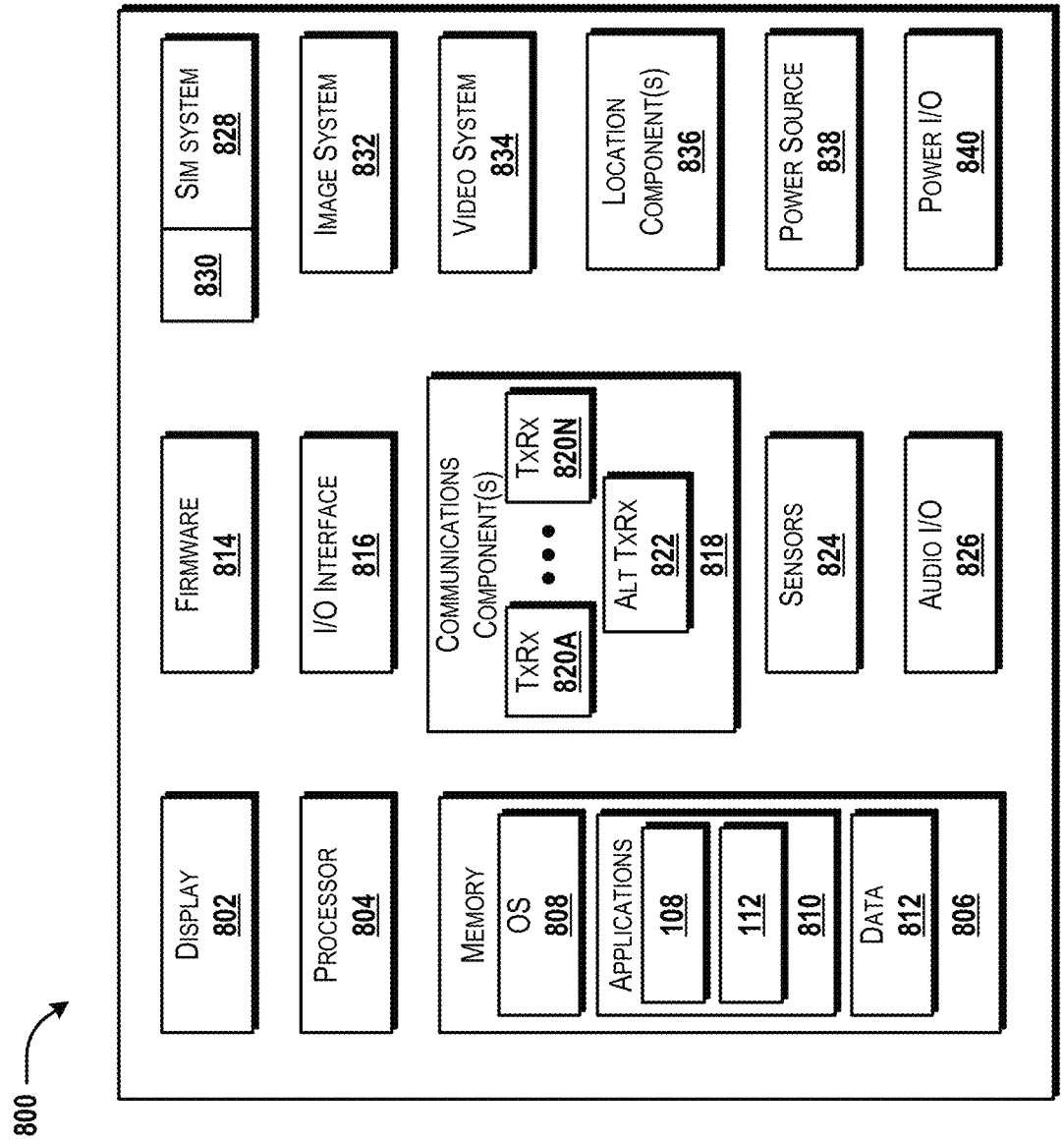
FIG. 8 is a block diagram illustrating an example mobile device configured to enable machine-to-machine communications for digital assistants, according to some illustrative embodiments of the concepts and technologies described herein.

Turning now to FIG. 8, an illustrative mobile device 800 and components thereof will be described. In some embodiments, the calling device 102 and/or the called device 114 described above with reference to FIGS. 1-5 can be configured as and/or can have an architecture similar or identical to the mobile device 800 described herein in FIG. 8. It should be understood, however, that the calling device 102 and/or the called device 114 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the assistant module 108 and/or the assistant detection application 112, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, for example to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the assistant module 108, the assistant detection application 112, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, the audio library 110, the audio stream data 116, the audio 118, the assistant signature data 120, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
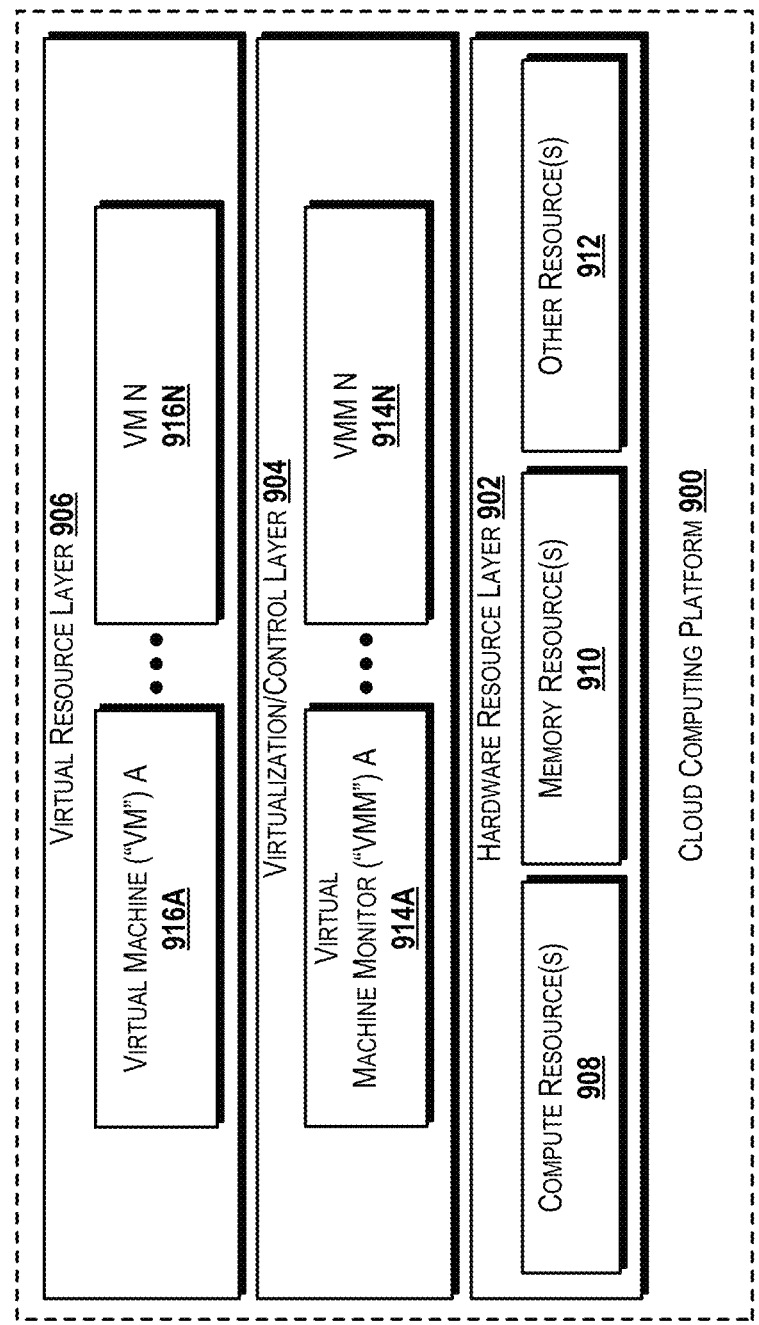
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for enabling machine-to-machine communication for digital assistants and/or for interacting with the assistant module 108 and/or the assistant detection application 112. Thus, it can be appreciated that in some embodiments of the concepts and technologies disclosed herein, the cloud computing platform 900 illustrated in FIG. 9 can be used to provide the functionality described herein with respect to the calling device 102 and/or the called device 114.

The cloud computing platform 900 thus may be utilized to execute any aspects of the software components presented herein. Thus, according to various embodiments of the concepts and technologies disclosed herein, the assistant module 108 and/or the assistant detection application 112 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the assistant module 108 and/or the assistant detection application 112 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 908 can be or can include one or more hardware components arranged in accordance with an ARM architecture, available for license from ARM HOLDINGS of Cambridge, United Kingdom. Alternatively, the compute resources 908 can be or can include one or more hardware components arranged in accordance with an x86 architecture, such as an architecture available from INTEL CORPORATION of Mountain View, California, and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the assistant module 108, the assistant detection application 112, and/or other applications, modules, or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the audio library 110, the audio stream data 116, the audio 118, the assistant signature data 120, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for enabling machine-to-machine communication for digital assistants have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:
a processor; and
a memory that stores computer-executable instructions that, when executed by the processor, cause the processor to perform operations comprising
initiating a call with a called device;
generating, using a first digital assistant, a first instance of audio stream data for the call, the first instance of audio stream data comprising a first instance of audio and a first spoken command to be provided to the called device during the call,
providing, to the called device and during the call, the first instance of audio stream data,
receiving, from the called device and during the call, a second instance of audio stream data, the second instance of audio stream data comprising second audio comprising a second spoken command, wherein the second spoken command comprises assistant signature data comprising a plurality of bit strings that are in binary, and wherein each of the plurality of bit strings ends with a least significant bit that has a same value,
analyzing the second instance of audio stream data to determine, based on the plurality of bit strings, that the second instance of audio stream data includes the assistant signature data, and
in response to determining that the second instance of audio stream data includes the assistant signature data, switching to machine-to-machine communications with the called device during the call.

2. The device of claim 1, wherein generating the first instance of audio stream data comprises obtaining a voice generator from an audio library stored in the memory and generating audio that represents the first spoken command.

3. The device of claim 1, wherein generating the first instance of audio stream data comprises obtaining a recorded spoken command from an audio library stored in the memory and generating audio that comprises the first spoken command.

4. The device of claim 1, wherein the assistant signature data further comprises a sound at a frequency that exceeds sixty-five thousand Hertz.

5. The device of claim 1, wherein the first spoken command comprises a further plurality of bit strings in binary, and wherein generating the first instance of audio stream data for the call comprises generating further assistant signature data by forcing respective least significant bits of the further plurality of bit strings to the same value.

6. The device of claim 1, wherein the first spoken command comprises a sound at a frequency that exceeds twenty thousand Hertz.

7. The device of claim 1, wherein the machine-to-machine communications comprise a data session.

8. A method comprising:
initiating, by a calling device comprising a processor, a call with a called device;
generating, by the processor and using a first digital assistant, a first instance of audio stream data for the call, the first instance of audio stream data comprising a first instance of audio and a first spoken command to be provided to the called device during the call;
providing, by the processor and to the called device and during the call, the first instance of audio stream data;
receiving, by the processor and from the called device and during the call, a second instance of audio stream data, the second instance of audio stream data comprising second audio comprising a second spoken command, wherein the second spoken command comprises assistant signature data comprising a plurality of bit strings that are in binary, and wherein each of the plurality of bit strings ends with a least significant bit that has a same value;
analyzing, by the processor, the second instance of audio stream data to determine, based on the plurality of bit strings, that the second instance of audio stream data includes the assistant signature data; and
in response to determining that the second instance of audio stream data includes the assistant signature data, switching, by the processor, to machine-to-machine communications with the called device during the call.

9. The method of claim 8, wherein the calling device comprises a memory, and wherein generating the first instance of audio stream data comprises obtaining a voice generator from an audio library stored in the memory and generating audio that represents the first spoken command.

10. The method of claim 8, wherein the calling device comprises a memory, and wherein generating the first instance of audio stream data comprises obtaining a recorded spoken command from an audio library stored in the memory and generating audio that comprises the first spoken command.

11. The method of claim 8, wherein the assistant signature data further comprises a sound at a frequency that exceeds sixty-five thousand Hertz.

12. The method of claim 8, wherein the first spoken command comprises a further plurality of bit strings in binary, and wherein generating the first instance of audio stream data for the call comprises generating further assistant signature data by forcing respective least significant bits of the further plurality of bit strings to the same value.

13. The method of claim 8, wherein the first spoken command comprises a sound at a frequency that exceeds twenty thousand Hertz.

14. The method of claim 8, wherein the machine-to-machine communications comprise a data session.

15. A computer storage medium having computer-executable instructions stored thereon that, when executed by a processor, cause the processor to perform operations comprising:
   initiating, by a calling device, a call with a called device;
   generating, using a first digital assistant, a first instance of audio stream data for the call, the first instance of audio stream data comprising a first instance of audio and a first spoken command to be provided to the called device during the call;
   providing, to the called device and during the call, the first instance of audio stream data;
   receiving, from the called device and during the call, a second instance of audio stream data, the second instance of audio stream data comprising second audio comprising a second spoken command, wherein the second spoken command comprises assistant signature data comprising a plurality of bit strings that are in binary, and wherein each of the plurality of bit strings ends with a least significant bit that has a same value;
   analyzing the second instance of audio stream data to determine, based on the plurality of bit strings, that the second instance of audio stream data includes the assistant signature data; and
   in response to determining that the second instance of audio stream data includes the assistant signature data, switching to machine-to-machine communications with the called device during the call.

16. The computer storage medium of claim 15, wherein the calling device comprises a memory, and wherein generating the first instance of audio stream data comprises obtaining a voice generator from an audio library stored in the memory and generating audio that represents the first spoken command.

17. The computer storage medium of claim 15, wherein the calling device comprises a memory, and wherein generating the first instance of audio stream data comprises obtaining a recorded spoken command from an audio library stored in the memory and generating audio that comprises the first spoken command.

18. The computer storage medium of claim 15, wherein the assistant signature data further comprises a sound at a frequency that exceeds sixty-five thousand Hertz.

19. The computer storage medium of claim 15, wherein the first spoken command comprises a further plurality of bit strings in binary, and wherein generating the first instance of audio stream data for the call comprises generating further assistant signature data by forcing-modifying respective least significant bits of the further plurality of bit strings to the same value.

20. The computer storage medium of claim 15, wherein the first spoken command comprises a sound at a frequency that exceeds twenty thousand Hertz.

* * * * *